United States Patent
Lakshminarayanan et al.

(10) Patent No.: US 11,159,773 B1
(45) Date of Patent: Oct. 26, 2021

(54) SPATIAL LIGHT MODULATOR CONTROL

(71) Applicant: TEXAS INSTRUMENTS INCORPORATED, Dallas, TX (US)

(72) Inventors: Aravind Lakshminarayanan, Plano, TX (US); Daniel J. Morgan, McKinney, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/119,277

(22) Filed: Dec. 11, 2020

(51) Int. Cl.
*H04N 9/31* (2006.01)

(52) U.S. Cl.
CPC ......... *H04N 9/3111* (2013.01); *H04N 9/3179* (2013.01)

(58) Field of Classification Search
CPC .. H04N 9/3111; H04N 9/3179; H04N 9/3105; H04N 9/3197; H04N 9/3102; H04N 9/3108; H04N 9/3182; H04N 9/3185; H04N 9/3114; H04N 9/3188
USPC ....... 348/744, 759–761, 764, 766, 770, 771; 353/39, 44
See application file for complete search history.

(56) References Cited

U.S. PATENT DOCUMENTS

| | | | |
|---|---|---|---|
| 2007/0063996 A1* | 3/2007 | Childers | .............. H04N 9/3114 345/204 |
| 2007/0064007 A1* | 3/2007 | Childers | ................ G09G 3/346 345/589 |

* cited by examiner

*Primary Examiner* — Sherrie Hsia
(74) *Attorney, Agent, or Firm* — Michelle F. Murray; Charles A. Brill; Frank D. Cimino (57) ABSTRACT

A control circuit includes a sequencing circuit. The sequencing circuit is configured to, in a color cycle: transfer a first bit plane to a spatial light modulator (SLM) and transmit a first global reset signal to the SLM instructing the SLM to load data of the first bit plane to pixel sub arrays of the SLM. The sequencing circuit is also configured to, in the color cycle: transfer a second bit plane to the SLM, and transmit a second global reset signal instructing the SLM to load data of the second bit plane to a first pixel sub-array of the pixel sub-arrays and to load data of the first bit plane to a second pixel sub-array of the pixel sub-arrays.

18 Claims, 7 Drawing Sheets

SPATIAL LIGHT MODULATOR CONTROL

BACKGROUND

Many image display systems utilize spatial light modulators (SLMs). SLMs include arrays of individually addressable and controllable pixel elements that modulate light according to input data streams corresponding to image frame pixel data.

Digital micromirror devices (DMDs) are a type of SLM, and may be used for either direct-view or projection display applications. A DMD has an array of micromechanical pixel elements, each having a tiny mirror that is individually addressable by an electrical signal. Depending on the state of its addressing signal, each mirror element tilts so that it either does or does not reflect light to the image plane. Other SLMs operate on similar principles, with arrays of pixel elements that may emit or reflect light simultaneously with other pixel elements, such that a complete image is generated by sequences of addressing the pixel elements.

Other examples of an SLIM include a liquid crystal display (LCD) or a liquid crystal on silicon (LCOS) display which have individually driven pixel elements. An LCOS device includes a liquid crystal display shutter disposed between a mirror and a layer of glass. The liquid crystals are modulated to pass light, the light passed through the liquid crystal is reflected, by the mirror, through a color filter. In the various types of SLMs, displaying each frame of pixel data is accomplished by loading memory cells so that pixel elements can be simultaneously addressed.

SUMMARY

A spatial light modulator (SLM) control circuit that applies a global reset signal to control the SLM pixels is described herein. In one example, a control circuit includes a sequencing circuit. The sequencing circuit is configured to, in a color cycle: transfer a first bit plane to an SLM and transmit a first global reset signal to the SLM instructing the SLM to load data of the first bit plane to pixel sub arrays of the SLM. The sequencing circuit is also configured to, in the color cycle: transfer a second bit plane to the SLM, and transmit a second global reset signal instructing the SLM to load data of the second bit plane to a first pixel sub-array of the pixel sub-arrays and to load data of the first bit plane to a second pixel sub-array of the pixel sub-arrays.

In another example, an SLM includes a pixel array and a memory. The pixel array includes pixel sub-arrays. The memory is coupled to the pixel array. The memory is configured to store pixel data. The SLM is configured to, in a color cycle 1) receive a first bit plane and store the first bit plane in the memory; 2) receive a first global reset signal responsive to receiving a first global reset signal, transfer data of the first bit plane from the memory to the pixel sub-arrays; 3) receive a second bit plane and store the second bit plane in the memory; and 4) responsive to receiving a second global reset signal: transfer data of the second bit plane to a first of the pixel sub-arrays; and transfer data of the first bit plane from the memory to a second of the pixel sub-arrays.

In a further example, a projector includes an SLM and a control circuit. The SLM includes a pixel array. The pixel array includes a first pixel sub-array, a second pixel sub-array, and a third pixel sub-array. The control circuit is coupled to the SLM. The control circuit includes a sequencing circuit. The sequencing circuit configured to, in a color cycle: 1) transmit a first global reset signal to the SLM, wherein responsive to receiving the first global reset signal, the SLM is configured to load data of a first bit plane to the first pixel sub-array, to the second pixel sub-array, and to the third pixel sub-array; 2) transmit a second global reset signal to the SLM, wherein responsive to receiving the second global reset signal, the SLM is configured to: load data of a second bit plane to the first pixel sub-array; and load data of the first bit plane to the second pixel sub-array; 3) transmit a third global reset signal to the SLM, wherein responsive to receiving the third global reset signal, the SLM is configured to: load data of a third bit plane to the first pixel sub-array; and load data of the first bit plane to the second pixel sub-array and to the third pixel sub-array.

BRIEF DESCRIPTION OF THE DRAWINGS

For a detailed description of various examples, reference will now be made to the accompanying drawings in which.

DETAILED DESCRIPTION

In this description, the term "couple" or "couples" means either an indirect or direct wired or wireless connection. Thus, if a first device couples to a second device, that connection may be through a direct connection or through an indirect connection via other devices and connections. Also, in this description, the recitation "based on" means "based at least in part on." Therefore, if X is based on Y, then X may be a function of Y and any number of other factors.

In some spatial light modulators (SLMs), the array of pixels is divided into multiple sub-arrays (or stripes). Each sub-array of pixels is controlled by loading pixel data into memory cells corresponding to the pixels, and after loading the data, setting the pixels to the positions specified by the data. Each of the sub-arrays of pixels may be set at a different time to increase native bit depth. In some such SLMs, such as digital micromirror devices, when the sub-arrays of pixels are set at different times, the adjacent mirrors of different sub-arrays (the mirrors at the boundaries of the sub-arrays) may collide and be damaged. Such damage reduces yield and increases cost.

The SLM devices described herein reduce or eliminate damage at the boundaries of sub-arrays of pixels by setting all pixels of the SLM simultaneously rather than setting the pixels of the different sub-arrays at different times. The position data for one or more of the sub-arrays of pixels are loaded at different times, and after loading of position data for a given sub-array of pixels, all pixels of the SLM are set in accordance with position data stored for the pixels. Because only the position data for the given sub-array of pixels was changed by the loaded position data, only the positions of the pixels of the given sub-array of micromirrors is changed. Performance of the SLM devices, with respect to native bit depth and brightness is not reduced by simultaneous setting all pixels as described herein. The SLM devices offer bit depths equivalent to phased pulse width modulated sequences while using only global resets and suffering no loss of brightness. Furthermore, true global SLM can be manufactured such that the SLM reliability is significantly improved.

The methods disclosed herein may also be applicable to spatial light modulators (SLM) used in direct imaging systems. For example, an implementation of the invention may be applied in a liquid crystal on silicon (LCOS) display system to provide higher bit depth. In micro-light emitting diode (micro-LED) systems, the methods disclosed herein can be used to simplify the display control circuitry (while achieving a desired display bit depth), thereby reducing system cost.

Figure 1A:
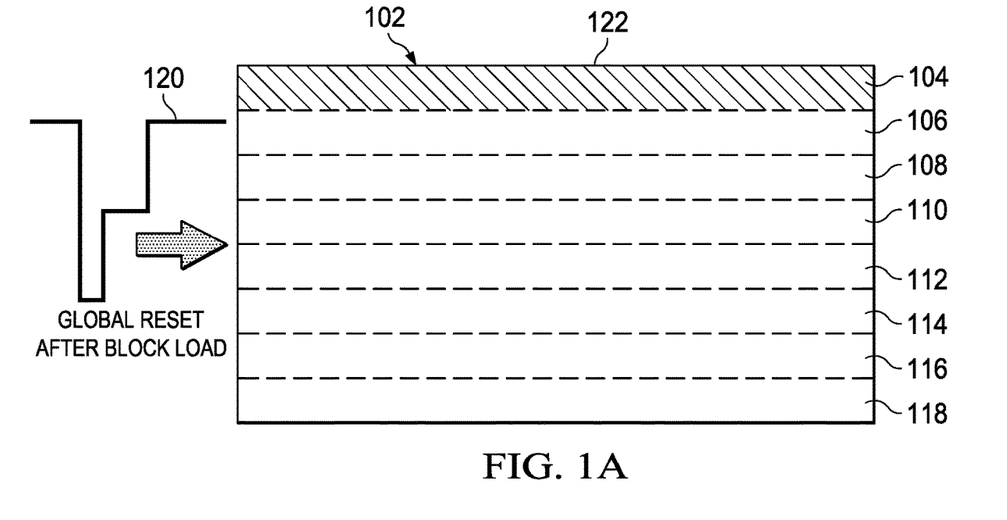
FIGS. 1A and 1B show example control of a spatial light modulator (SLM) using a global reset signal for all sub-arrays of pixels.
Figure 1B:
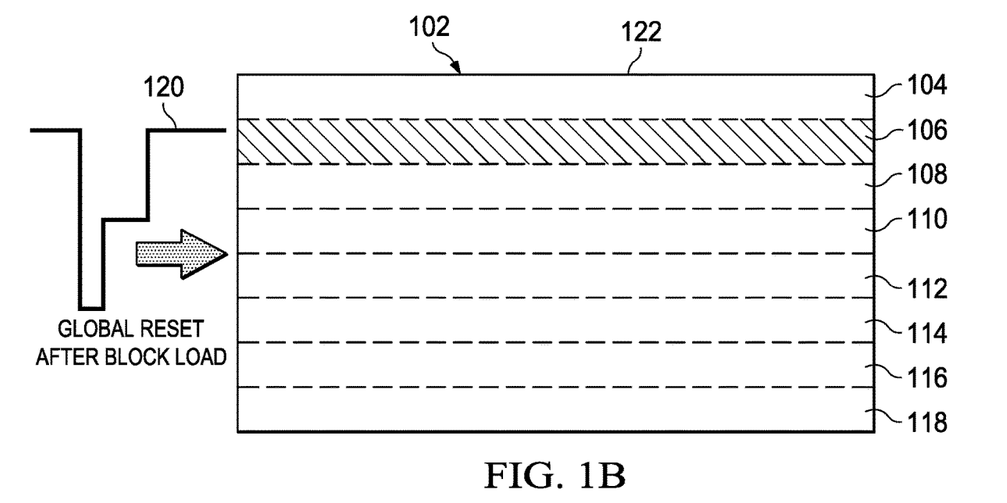

FIGS. 1A and 1B show example control of an SLM using a global reset signal for the sub-arrays of pixels. Applicable SLMs include DMDs, LCOS devices, and/or micro-LED devices. In FIGS. 1A and 1B, the pixel array 102 of a SLM is partitioned into the pixel sub-arrays 104-118. A global reset signal 120 is provided to control all of the pixel sub-arrays 104-118. The global reset signal 120 is pulsed low from a bias voltage to a reset voltage, held low for a first time, then pulled up and maintained at an offset voltage for a second time after which it is pulled up back to the bias voltage. The bias, reset, and offset voltage levels as well the time duration at the levels vary across different types of SLM devices (depending on pixel size, resolution etc.) Some SLMs may generate the global reset signal 120 internally responsive to receipt of global reset request. In FIG. 1A, the position data underlying the pixel sub-array 104 has been loaded and the global reset signal 120 is activated to set the positions of the pixels of the pixel sub-arrays 104-118. That is, with activation of the global reset signal 120, the positions of the pixels of all of the pixels of the pixel sub-arrays 104-118 are set in accordance with position data underlying the pixels. If only the position data associated with the pixel sub-array 104 has been changed, then only the positions of the pixels of the pixel sub-array 104 will be changed by activation of the global reset signal 120. Similarly, in FIG. 1B, the position data underlying the pixel sub-array 106 has been loaded and the global reset signal 120 is activated to set the positions of the pixels of the pixel sub-arrays 104-118. If only the position data associated with the pixel sub-array 106 has been changed, then only the positions of the pixels of the pixel sub-array 106 will be changed by activation of the global reset signal 120. The pixels of sub-arrays not changed remain at their previous positions. Because all of the pixels are set with each activation of the global reset signal, damage to the pixels of adjacent sub-arrays is avoided.

Figure 2:
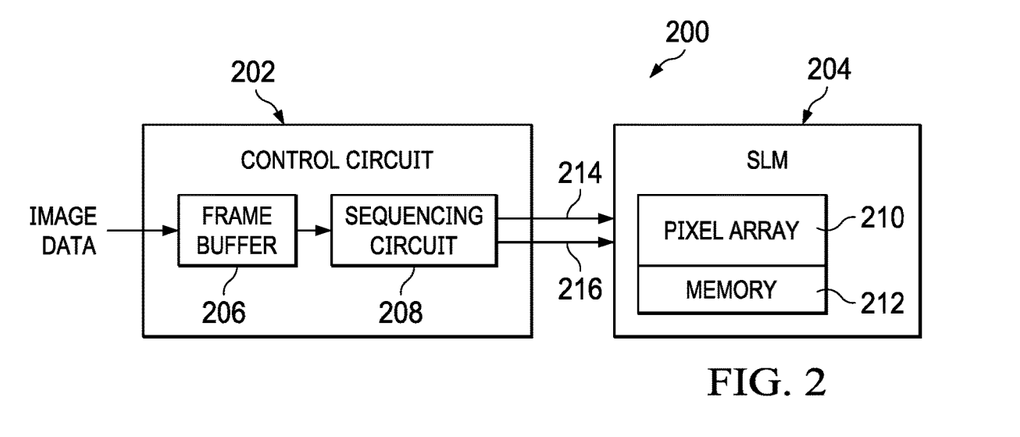
FIG. 2 shows a block diagram for an example optical projection system that uses a global reset signal to control an SLM.

FIG. 2 shows a block diagram for an example optical projection system 200. The optical projection system 200 includes a control circuit 202 coupled to a SLM 204. Implementations of the optical projection system 200 may include a variety of additional components, such as a light source, optics, an illumination source driver, etc. that are not shown in FIG. 2. The SLM 204 includes a pixel array 210 (a two-dimensional pixel array) and a memory 212 coupled to the pixel array 210. The pixel array 210 is an implementation of the pixel array 102. The memory 212 includes an array of memory cells, with the memory cells providing storage for position data applied to one of the pixels of the pixel array 210.

The control circuit 202 includes a frame buffer 206 and a sequencing circuit 208. The frame buffer 206 stores image data that is to be displayed using the SLM 204. The frame buffer 202 may be loaded by a direct memory access controller, a processor core, or other data transfer circuitry coupled to an image source such as an image capture device (e.g., a camera) or an image storage device that provides image data for display. The sequencing circuit 208 is coupled to the frame buffer 206. The sequencing circuit 208 reads the image data from the frame buffer 206, and loads the image data to the memory 212 as multiple bit planes 214 for each color (e.g., red, green, and blue) provided in the image data. A bit plane is a collection of a single bit (of a multi-bit color value) for all pixels of the SLM 204 stored in the memory 212. For example, bit plane zero of the color of a given color (e.g., red) represents the least significant bit red content stored in the memory 212 for every pixel of the SLM 204. The sequencing circuit 208 generates a global reset signal 216 that, when activated, causes the pixel array 210 to set the positions of the pixels based on the position data stored in the memory 212. The sequencing circuit 208 may include state machine circuitry to control the transfer of image data from frame buffer 206 to the pixel array 210. Operation of the sequencing circuit 208 is further explained by reference to the methods 300, 400, and 600.

Figure 3:
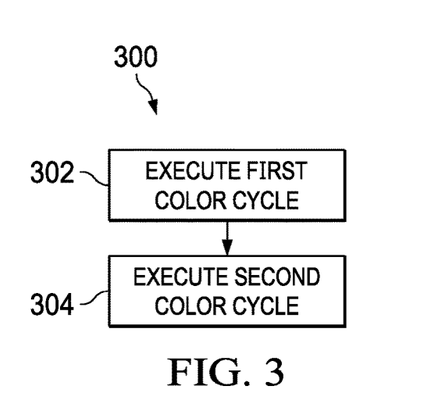
FIG. 3 shows a flow diagram for an example method for controlling an SLM.

FIG. 3 shows a flow diagram for an example method 300 for controlling a SLM. Though depicted sequentially as a matter of convenience, at least some of the actions shown can be performed in a different order and/or performed in parallel. Additionally, some implementations may perform only some of the actions shown. Operations of the method 300 may be performed by the optical projection system 200, and more specifically by the sequencing circuit 208.

In operations of the method 300, the sequencing circuit 208 reads frames from the frame buffer 206, and generates from the frames the bit planes to be transferred to the memory 212. In the method 300, the sequencing circuit 208 also controls the pixel array 210, where the pixel array 210 is partitioned (e.g., by design) into sub-arrays of pixels. For example, the pixel array 210 is partitioned into a first sub-array of pixels, a second sub-array of pixels, a third sub-array of pixels, etc. as shown in FIG. 1. Each sub-array of pixels may be one or more vertical or horizontal stripes of pixels (rows or columns) as shown in FIG. 1. As shown in FIG. 1, the pixel sub-array 104 is nearer an edge 122 of the pixel array 102 than is the pixel sub-array 106, and the pixel sub-array 106 is nearer the edge 122 than is the pixel array 108.

In block 302, the sequencing circuit 208 executes a first color cycle. The sequencing circuit 208 transfers pixel data to the memory 212 as bit plane data in color cycles. A color cycle is an instance of display of a particular color within a frame period. Different colors may have a different number of color cycles per frame. In a given color cycle, the sequencing circuit 208 transfers data for a single color to the memory 212 as multiple levels of color significance (bit planes) as described herein.

In block 304, the sequencing circuit 208 executes a second color cycle. The sequencing circuit 208 transfers pixel data to the memory 212 in the second color cycle. Transfer of data to the memory 212 may be via a parallel interface to reduce transfer time, or via a serial interface in some implementations. Implementations of the method 300 may apply any number of color cycles. For each color, the number of color cycles applied may differ.

In the sequencing operations of the color cycles of the method 300, use of the global reset signal ensures that updates to the SLM pixel array are comprehensive. The sequencing operations uses three types of bit segments: bookend bits, bit pairs, and standalone bits. The bookend bits are transferred to the memory 212 immediately before and after the bit pairs. When using a single color cycle per frame, the leading and trailing bookend bits use a same bit plane. When more than one color cycle is used, the bookends may use different bit planes as long as each bit plane has equal number of leading & trailing bookends. The bookend bits may be the most significant bit (MSB) bit plane of the color.

The bit pairs provide high bit depth, by pairing smaller bits (in duration, henceforth referred to as Least Significant Bits or LSBs) with longer bits (in duration, henceforth referred to as Most Significant Bit or MSBs) that exceeds a device load time. For example, the LSB may be paired with the MSB−1, the LSB+1 may be paired with the MSB−2, etc. After loading the first bit of a bit pair, the second bit of the pair is loaded prior to loading of any other bit. The sequencing circuit 208 may issue a block clear instruction to the SLM 204 to provide a bit duration lower than a bit load time. For example, a block clear instruction may be issued between two global reset signals to reset a portion of an SLM pixel array, thereby reducing bit application time. If a bit's effective light time (bit display duration) exceeds a sub-array load time, then more than one sub-array may be loaded per bit in a bit pair.

The bookend bits and the bit pairs loaded in a color cycle constitute an odd number of bit planes. When the number of bit planes to be loaded in a color cycle is even, the standalone bit is loaded after the trailing bookend bit of the present color cycle and before the leading bookend of any next color cycle. For an even number of bit planes (N), the bookend bits are the MSB bit, and the bit pairs are MSB−x−1, LSB+x pairs (where x is 0−N/2), the standalone bit is MSB−N/2.

For bit planes that are to be displayed for a longer time than is needed to load a sub-array, multiple sub-arrays may be loaded for each assertion of the global reset signal. Such operation results in non-uniform bit duration across the SLM. To compensate within a single color cycle, where each sub-array load is followed by assertion of the global rest signal, the duration of preceding or succeeding bit planes may be slightly increased to insure uniform duration across the SLM. To compensate within multiple color cycles of an even number, the direction of bit plane loading may be altered (e.g., top-to-bottom in a first color cycle, and bottom-to-top in a second color cycle, or vice-versa). To compensate within multiple color cycles of an odd number, one color cycle is compensated as the single color cycle, and the remaining even number of color cycles using direction alteration for compensation.

Figure 4:
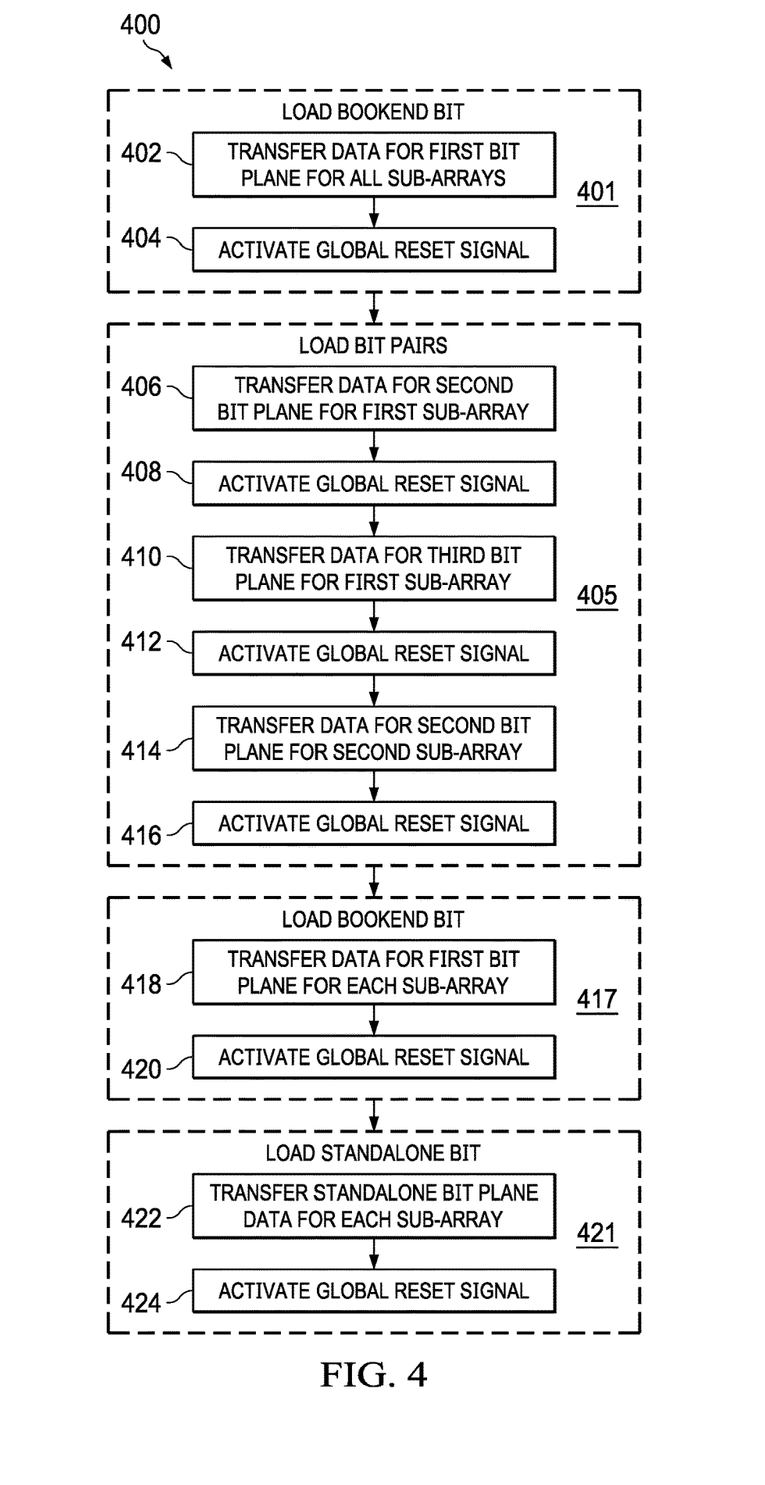
FIG. 4 shows a flow diagram for an example method for using a global reset signal to control an SLM in a single color cycle using a global reset signal.

FIG. 4 shows a flow diagram for an example method 400 for using a global reset signal to control a SLM in a first color cycle. Though depicted sequentially as a matter of convenience, at least some of the actions shown can be performed in a different order and/or performed in parallel. Additionally, some implementations may perform only some of the actions shown. Operations of the method 400 may be performed by the optical projection system 200, and more specifically by the sequencing circuit 208 as part of the operation of block 304 of the method 300.

Figure 5:
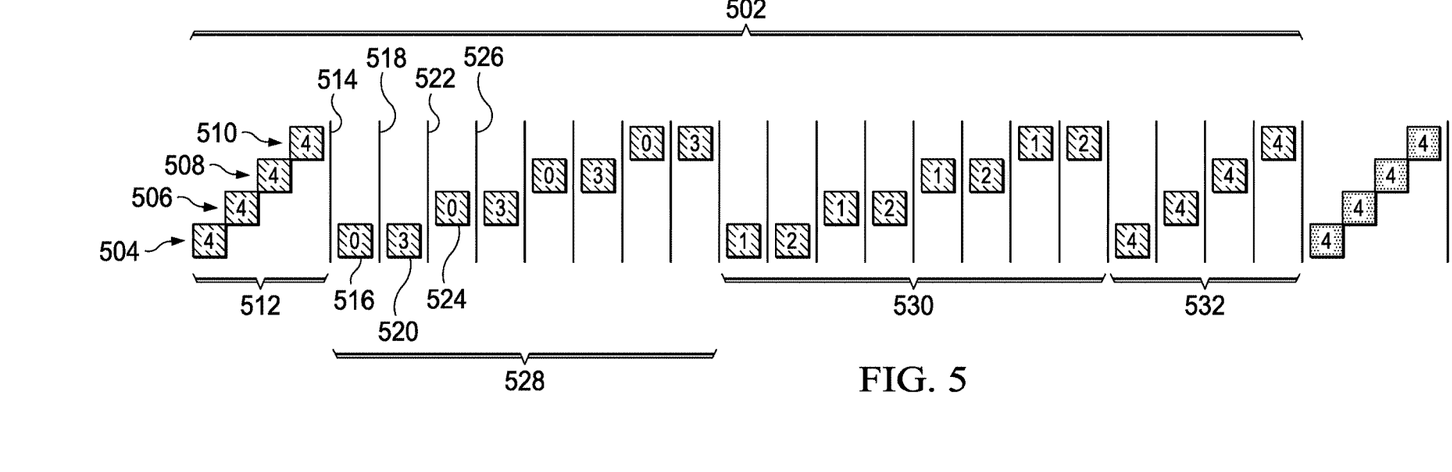
FIGS. 5 and 6 show examples of controlling an SLM in one color cycle using a global reset signal.
Figure 6:
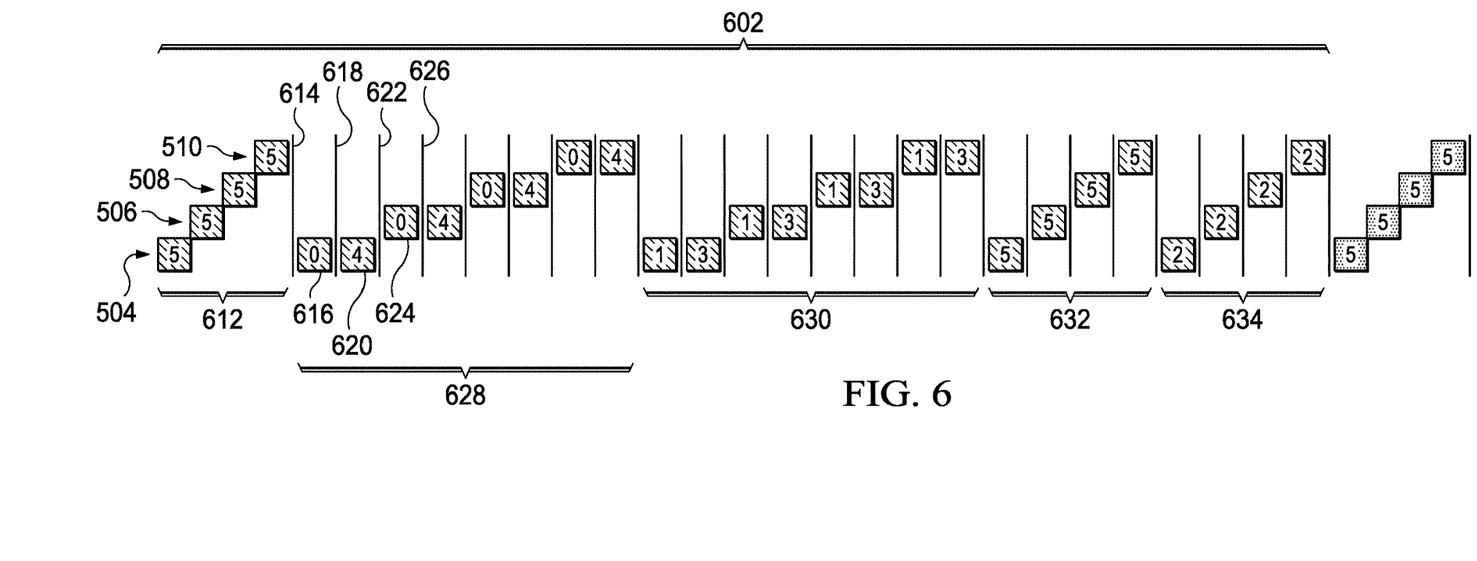

Operations of the method 400 are explained with reference to FIGS. 5 and 6, which show examples of controlling a SLM in color cycle 502 and color cycle 602 using a global reset signal. In FIGS. 5 and 6, row 504 represents a first sub-array of pixels; row 506 represents a second sub-array of pixels, row 508 represents a third sub-array of pixels, and row 510 represents a fourth sub-array of pixels. While FIGS. 5 and 6 show four sub-arrays of pixels, the pixel array 210 may include any number of sub-arrays of pixels. To illustrate operation, five bit planes are loaded to the pixel array 210 in FIG. 5, and six bit planes are loaded the pixel array 210 in FIG. 6. Various implementations of the sequencing circuit 208 may load any number of bit planes to the pixel array 210. For example, 5-21 bit planes per color cycle may be used some implementations.

In block 401 (blocks 402 and 404), the sequencing circuit 208 loads a book end bit. In block 402, the sequencing circuit 208 transfers data for a first bit plane for all sub-arrays to the memory 212 for application to the pixels of the pixel array 210. Referring to FIG. 5, at 512, the sequencing circuit 208 loads data for bit plane 4 to the memory 212 for the sub-arrays of pixels corresponding to rows 504-510. The data for bit plane 4 may correspond to the MSB bit plane of the color. Similarly, in FIG. 6, at 612, the sequencing circuit 208 loads data for bit plane 5 to the memory 212 for the sub-arrays of pixels corresponding to rows 504-510, where bit plane 5 may correspond to the MSB bit plane for the color.

In block 404 (at 514 in FIG. 5, 614 in FIG. 6), the sequencing circuit 208 activates the global reset signal to load data of the first bit plane to all sub-arrays, and sets the positions the pixels of the pixel array 210 according to the position data stored in the memory 212. For example, circuitry of the SLM detects the global reset signal and resets the SLM (e.g., sets the positions of micromirrors of a DMD or other pixel elements of the SLM) based on the data stored in the memory 212.

In block 405 (blocks 406-416), the sequencing circuit 208 loads bit pairs. In interval 528 of FIG. 5 (interval 628 of FIG. 6) the sequencing circuit 208 loads data for a first bit pair (e.g., LSB and MSB−1) to the memory 212. In block 406, the sequencing circuit 208 transfers data for a second bit plane for a first sub-array to the memory 212 for application to pixels of the pixel array 210 (e.g., pixel sub-array 104 of the pixel array 102). Referring to FIG. 5, at 516 and to FIGS. 6 and 616, the sequencing circuit 208 loads data for bit plane 0 to the memory 212 for the sub-array of pixels corresponding to row 504. The data for bit plane 0 may correspond to the least significant bit (LSB) plane of the color.

In block 408 (at 518 in FIGS. 5 and 618 of FIG. 6), the sequencing circuit 208 activates the global reset signal to load data of the second bit plane to the first sub-array and load data of the first bit plane to the all other sub-arrays, thereby setting the positions the pixels of the pixel array 210 according to the position data stored in the memory 212. The sub-array of pixels corresponding to row 504 is set with the data for bit plane 0, while the sub-arrays of pixels corresponding to rows 506-510 are set with data for bit plane 4 in FIG. 5 and to bit plane 5 in FIG. 6.

In block 410, the sequencing circuit 208 transfers data for a third bit plane for the first sub-array to the memory 212 for application to the pixels of the pixel array 210 (e.g., pixel sub-array 104 of the pixel array 102). Referring to FIG. 5, at 520, the sequencing circuit 208 loads data for bit plane 3 to the memory 212 for the sub-array of pixels corresponding to row 504. Similarly, in FIG. 6, at 620, the sequencing circuit 208 loads data for bit plane 4 to the memory 212 for the sub-array of pixels corresponding to row 504. The data for bit plane 3 in FIG. 5 and bit plane 4 in FIG. 6 corresponds to the MSB−1 bit plane of the color.

In block 412 (at 522 in FIGS. 5 and 622 in FIG. 6), the sequencing circuit 208 activates the global reset signal to set the positions the pixels of the pixel array 210 according to the position data stored in the memory 212. The sub-array of pixels corresponding to row 504 is set with the data for bit plane 3 in FIG. 5 and bit plane 4 in FIG. 6, while the sub-arrays of pixels corresponding to rows 506-510 are set with data for bit plane 4 in FIG. 5 and bit plane 5 in FIG. 6.

In block 414, the sequencing circuit 208 transfers data for the second bit plane for a second sub-array to the memory 212 for application to the pixels of the pixel array 210 (e.g., pixel sub-array 106 of the pixel array 102). Referring to FIG. 5, at 524, and to FIG. 6 at 624, the sequencing circuit 208 loads data for bit plane 0 to the memory 212 for the sub-array of pixels corresponding to row 506. The data for bit plane 0 corresponds to the LSB bit plane of the color cycle.

In block 416 (at 526 in FIGS. 5 and 626 in FIG. 6), the sequencing circuit 208 activates the global reset signal to set the positions the pixels of the pixel array 210 according to the position data stored in the memory 212. The sub-array of pixels corresponding to row 504 is set with the data for bit plane 3 in FIG. 5 and for bit plane 4 in FIG. 6, the sub-array of pixels corresponding to row 506 is set with the data for bit plane 0, and the sub-arrays of pixels corresponding to rows 508-510 are set with data for bit plane 4 in FIG. 5 and for bit plane 5 in FIG. 6.

The operations of blocks 414 and 416 correspond to the operations of blocks 406 and 408 with application to the sub-array of pixels of row 506. Generally, over the interval 528 of FIG. 5 and 628 of FIG. 6, the operations of blocks 406-412 are repeated with application to each sub-array of pixels. A similar sequence of operations is applied with respect to a second bit pair in the interval 530 of FIG. 5, to apply the data for bit planes 1 and 2 to the pixel array 210, and in the interval 630 of FIG. 6 to apply the data for bit planes 1 and 3 to the pixel array 210.

In block 417 (blocks 418 and 420), the loading of bit pairs is complete, and the sequencing circuit 208 loads a bookend bit. In block 418, the sequencing circuit transfers data for the first bit plane (the bookend bit plane) for each sub-array to the memory 212. In block 420, after transferring the bookend bit plane for a sub-array, the sequencing circuit 208 activates the global reset signal to set the positions the pixels of the pixel array 210 according to the position data stored in the memory 212. The operations of blocks 418 and 420 are repeated for each sub-array. Referring to FIGS. 5 and 6, in interval 532 of FIG. 5 and 632 of FIG. 6, the sequencing circuit 208 loads the bookend bit to the memory 212. In FIG. 5, data for bit plane 4 is successively loaded to the memory 212 and, the global reset signal successively activated to load each sub-array of pixels to complete the color cycle 502. Similarly, in FIG. 6, data for bit plane 5 is successively loaded to the memory 212 and the global reset signal successively activated to load each sub-array of pixels.

Due to the even number of bit planes in the color cycle 602, a standalone bit is applied in the color cycle of FIG. 6. In block 421 (blocks 422 and 424), the sequencing circuit 208 loads the standalone bit. In block 422, the sequencing circuit transfers the standalone bit plane data for each of the sub-arrays. In block 424, the sequencing circuit 208 activates the global reset signal to set the positions the pixels of the pixel array 210 according to the position data stored in the memory 212. The operations of blocks 422 and 424 are repeated for each sub-array. Referring to FIG. 6, the sequencing circuit 208 loads a standalone bit in interval 634 of FIG. 6. Given the six bit planes of FIG. 6, data for bit plane 2 is successively loaded to the memory 212 and the global reset signal is successively activated to load each sub-array of pixels. Interval 634 completes the color cycle 602.

More significant bit planes may be applied to the sub-arrays of pixels for a longer time than less significant bit planes. The sequencing circuit 208 sequences the loading of the bit planes and the activation of the global reset signal such that each bit plane is applied to each sub-array of pixels for a same amount of time. That is, the sequencing circuit 208 equalizes the time that each bit plane is applied to each sub-array of pixels over the color cycle 502. The time elapsing between the activations of the global reset signal may vary. The method 400, as illustrated in the sequences of FIGS. 5 and 6, offers bit depths equivalent to phased pulse width modulated sequences while using only global resets and suffering no loss of brightness. Furthermore, true global SLM can be manufactured such that the SLM reliability is significantly improved.

Figures 7, 11:
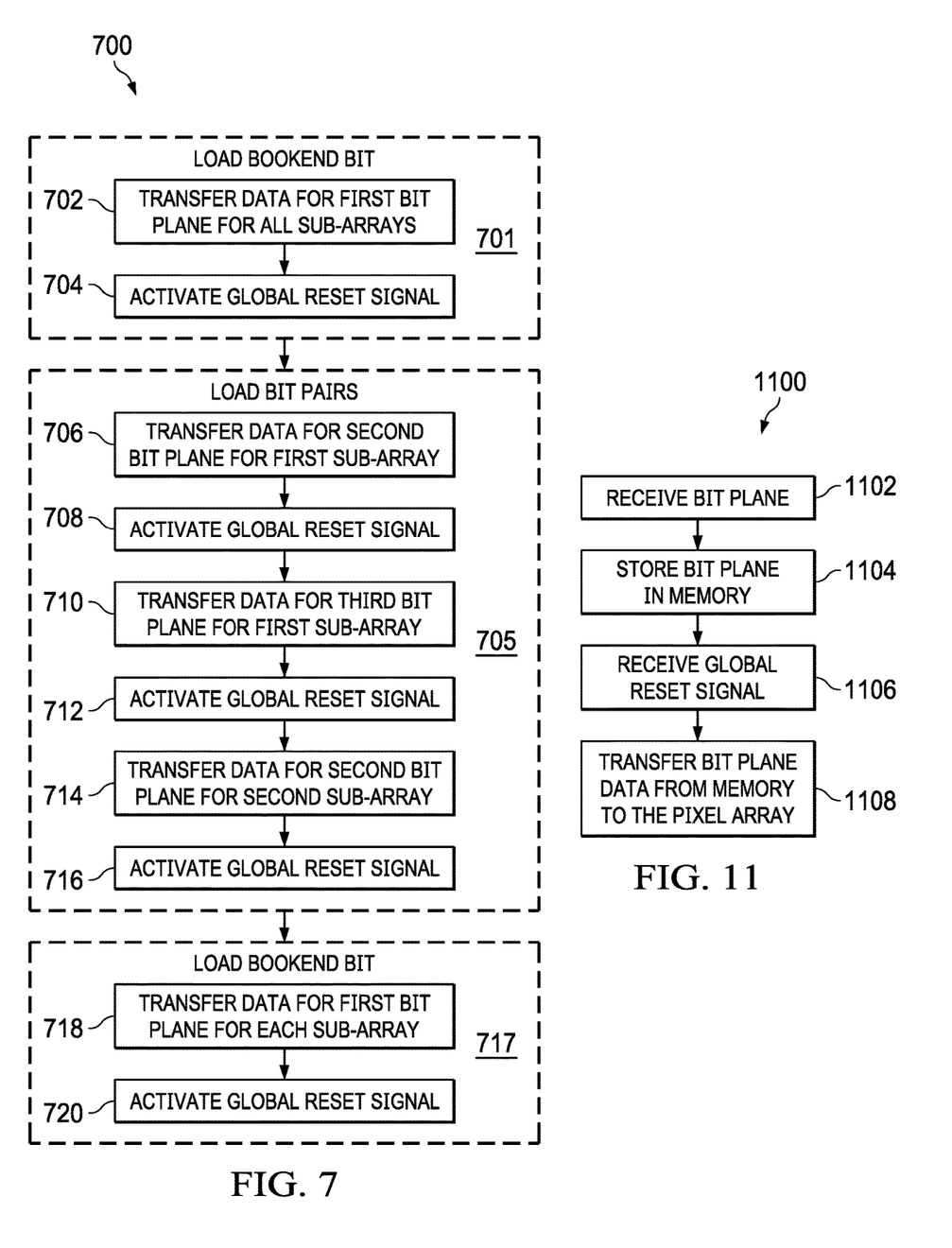
FIG. 7 shows a flow diagram for an example method for using a global reset signal to control an SLM in two color cycles using a global reset signal.
FIG. 11 shows a flow diagram for an example method for operating an SLM as described herein.

FIG. 7 shows a flow diagram for an example method 700 for using a global reset signal to control a SLM in two color cycles. Though depicted sequentially as a matter of convenience, at least some of the actions shown can be performed in a different order and/or performed in parallel. Additionally, some implementations may perform only some of the actions shown. Operations of the method 700 may be performed by the optical projection system 200, and more specifically by the sequencing circuit 208.

Figure 8:
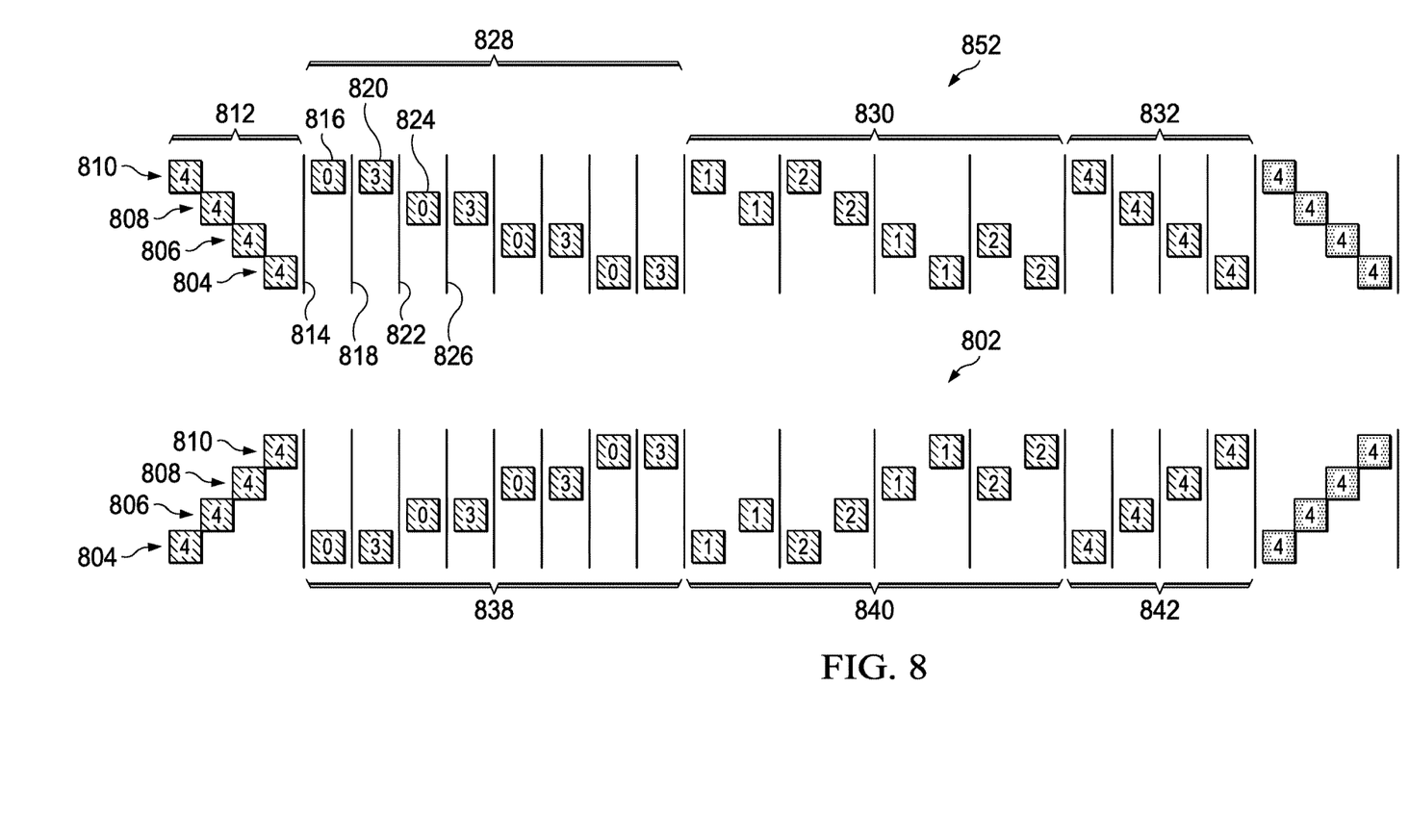
FIG. 8 shows an example of controlling an SLM in two color cycles using a global reset signal.

Operations of the method 700 are explained with reference to FIG. 8, which shows an example of controlling a SLM in two color cycles 802, 852 using a global reset signal. In FIG. 8, row 804 represents a first sub-array of pixels; row 806 represents a second sub-array of pixels, row 808 represents a third sub-array of pixels, and row 810 represents a fourth sub-array of pixels. While FIG. 8 shows four sub-arrays of pixels, the pixel array 210 may include any number of sub-arrays of pixels. Five bit planes are loaded to the pixel array 210 in FIG. 8 to illustrate operation, and various implementations of the sequencing circuit 208 may load any number of bit planes to the pixel array 210.

The operations applied in the color cycle 802 are similar to the operations illustrated in the color cycle 502. However, when an even number of color cycles is applied, the sequencing circuit 208 equalizes the application time of each bit plane to each sub-array of pixels over two color cycles rather than within a single color cycle as in the color cycle 502. In the color cycle 802 and the color cycle 852, the sequencing circuit 208 equalizes the bit plane application time by reversing the application of the bit planes with respect to the sub-arrays of pixels. For example, in the color cycle 802, bit plane 0 is first applied to the sub-array of pixels corresponding to row 804, and in the color cycle 852, bit plane 0 is first applied to the sub-array of pixels corresponding to row 810. Referring to FIG. 1, the color cycle 802 applies the bit planes to the pixel array 102 in a top-to-bottom sequence, and the color cycle 852 applies the bit planes to the pixel array 102 in a bottom-to-top sequence. Reversing the sequence of bit plane application over the sub-arrays of the pixels equalizes the time that the bit planes are applied to the sub-arrays of pixels over the two color cycles.

In block 701 (blocks 702 and 704), the sequencing circuit 208 loads a book end bit. In block 702, the sequencing circuit 208 loads data for a first bit plane for all sub-arrays to the memory 212 for application to pixels of the pixel array 210. Referring to FIG. 8, at 812, the sequencing circuit 208 loads data for bit plane 4 to the memory 212 for the sub-arrays of pixels corresponding to rows 804-810. The data for bit plane 4 may correspond to the most significant bit (MSB) bit plane of the color cycle.

In block 704 (at 814 in FIG. 8), the sequencing circuit 208 activates the global reset signal to set the positions the pixels of the pixel array 210 according to the position data stored in the memory 212.

In block 705 (blocks 706-716), the sequencing circuit 208 loads bit pairs. In block 706, the sequencing circuit 208 transfers data for a second bit plane for a first sub-array to the memory 212 for application to pixels of the pixel array 210 (e.g., pixel sub-array 104 of the pixel array 102). Referring to FIG. 8, at 816, the sequencing circuit 208 loads data for bit plane 0 to the memory 212 for the sub-array of pixels corresponding to row 810. The data for bit plane 0 may correspond to the least significant bit (LSB) bit plane of the color cycle.

In block 708 (at 818 in FIG. 8), the sequencing circuit 208 activates the global reset signal to set the positions of the pixels of the pixel array 210 according to the position data stored in the memory 212. The sub-array of pixels corresponding to row 810 is set with the data for bit plane 0, while the sub-arrays of pixels corresponding to rows 804-806 are set with data for bit plane 4.

In block 710, the sequencing circuit 208 transfers data for a third bit plane for the first sub-array to the memory 212 for application to pixels of the pixel array 210 (e.g., pixel sub-array 104 of the pixel array 102). Referring to FIG. 8, at 820, the sequencing circuit 208 loads data for bit plane 3 to the memory 212 for the sub-array of pixels corresponding to row 810. The data for bit plane 3 corresponds to the MSB−1 bit plane of the color cycle.

In block 712 (at 822 in FIG. 7), the sequencing circuit 208 activates the global reset signal to set the positions of the pixels of the pixel array 210 according to the position data stored in the memory 212. The sub-array of pixels corresponding to row 810 is set with the data for bit plane 3, while the sub-arrays of pixels corresponding to rows 804-808 are set with data for bit plane 4.

In block 714, the sequencing circuit 208 transfers data for the second bit plane for the second sub-array to the memory 212 for application to the pixels of the pixel array 210 (e.g., pixel sub-array 106 of the pixel array 102). Referring to FIG. 8, at 824, the sequencing circuit 208 loads data for bit plane 0 to the memory 212 for the sub-array of pixels corresponding to row 808. The data for bit plane 0 corresponds to the LSB bit plane of the color cycle.

In block 716 (at 826 in FIG. 8), the sequencing circuit 208 activates the global reset signal to set the positions of the pixels of the pixel array 210 according to the position data stored in the memory 212. The sub-array of pixels corresponding to row 810 is set with the data for bit plane 3, the sub-array of pixels corresponding to row 808 is set with the data for bit plane 0, and the sub-arrays of pixels corresponding to rows 804-806 are set with data for bit plane 4.

The operations of blocks 714 and 716 correspond to the operations of blocks 606 and 608 with application to the sub-array of pixels of row 808. Generally, over the interval 828 of FIG. 8 (loading a first bit pair in the color cycle 852), the operations of blocks 606-612 are repeated with application to each sub-array of pixels. In the interval 828, the loading sequence of the sub-arrays of the pixel array 210, is reversed with respect to the loading sequence applied in the interval 838 (loading the first bit pair) of the color cycle 802. In the interval 840 of the color cycle 802 and the interval 830 of the color cycle 852, bit plane 1 and bit plane 2 (the second bit pair) are loaded to the pixel array 210. In the interval 830, the loading sequence of the sub-arrays of the pixel array 210, is reversed with respect to the loading sequence applied in the interval 840 of the color cycle 802. In the intervals 830 and 840 multiple sub-arrays are loaded between global reset signal activations, which allows more time for higher order bits to hit bit depth targets. In the interval 842 of the color cycle 802 and the interval 832 of the color cycle 852, bit plane 4 is once again loaded to the pixel array 210.

In block 717 (blocks 718 and 720), the sequencing circuit 208 loads the bookend bit as per the operations of blocks 418 and 420. In the interval 832, the loading sequence of the sub-arrays of the pixel array 210 is reversed with respect to the loading sequence applied in the interval 842 of the color cycle 802. The sequence timing of the color cycle 802 and the color cycle 852 may be the same.

Figure 9:
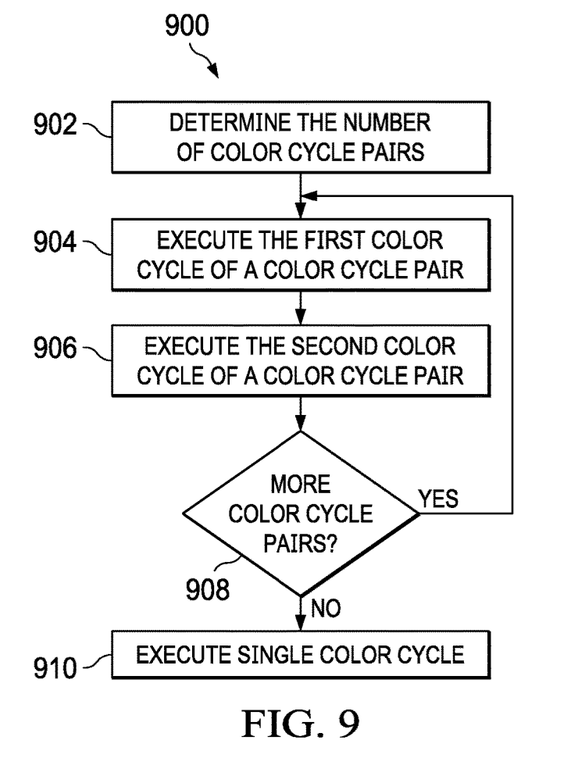
FIG. 9 shows a flow diagram for an example method for controlling an SLM in three color cycles using a global reset signal.

FIG. 9 shows a flow diagram for an example method 900 for using a global reset signal to control an SLM using an odd number of color cycles. Though depicted sequentially as a matter of convenience, at least some of the actions shown can be performed in a different order and/or performed in parallel. Additionally, some implementations may perform only some of the actions shown. Operations of the method 800 may be performed by the optical projection system 200, and more specifically by the sequencing circuit 208.

Figure 10:
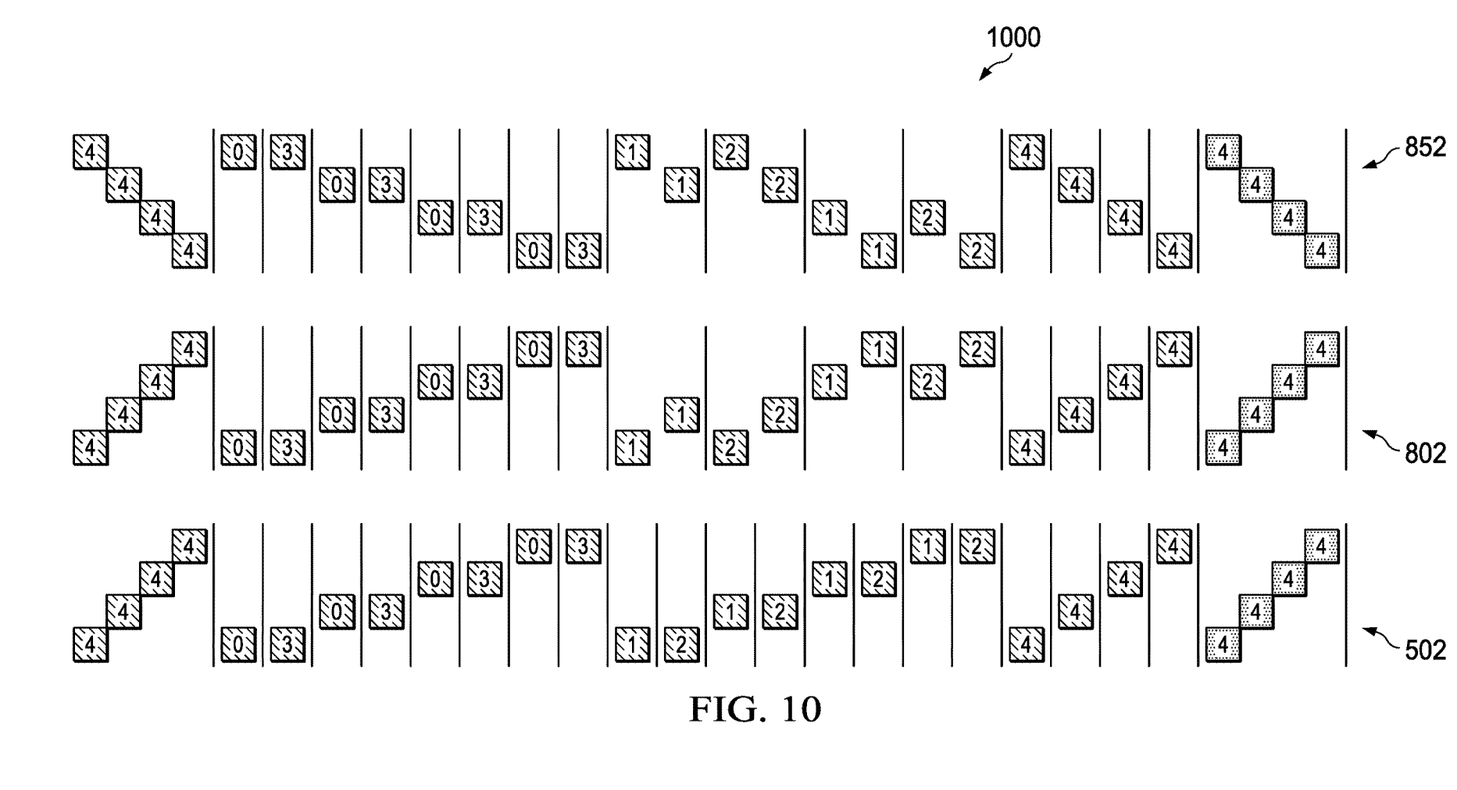
FIG. 10 shows an example of controlling an SLM in three color cycles using a global reset signal.

Operations of the method 900 are explained with reference to FIG. 10, which shows an example of controlling an SLM using three color cycles 502, 802, and 852 with a global reset signal. The method 900 is applicable to any odd number of color cycles greater than one (e.g., 3, 5, 7, etc.)

In block 902 the sequencing circuit 208 determines the number color cycle pairs to be executed by integer division of the total number of color cycles (N) by two. A color cycle pair includes a first color cycle and a second color cycle that equalize bit plane application time of the two color cycles of the color cycle pair. The color cycles 802 and 852 are an example of color cycle pair.

In block 904, the sequencing circuit 208 executes the first color cycle of the color cycle pair. Referring to the color cycle sequence 1000 of FIG. 10, the sequencing circuit 208 executes the color cycle 752.

In block 906, the sequencing circuit 208 executes the second color cycle of the color cycle pair. Referring to the color cycle sequence 1000 of FIG. 10, the sequencing circuit 208 executes the color cycle 802.

In block 908, the sequencing circuit 208 determines whether more color cycle pairs are to be executed (i.e., whether execution of the number of color cycle pairs computed in block 902 is complete). If execution of the color cycle pairs is not complete, then execution of the color cycle pairs continues in block 904.

If execution of the color cycle pairs is complete, then the sequencing circuit 208 executes a single color cycle in block 910. The single color cycle executed in block 910 equalizes the bit plane application time within the single color cycle. Referring to the color cycle sequence 1000 of FIG. 10, the sequencing circuit 208 executes the color cycle 502 as the single color cycle.

Thus, when an odd number of color cycles (N) are applied, the sequencing circuit 208 applies a single color cycle that equalizes the bit plane application time across the sub-arrays of pixels with the single color cycle, and the sequencing circuit 208 applies N−1 color cycles that equalize bit plane application time across the sub-arrays of pixels over two color cycles.

FIG. 11 shows a flow diagram for an example method 1100 for operating an SLM using a global reset signal. Though depicted sequentially as a matter of convenience, at least some of the actions shown can be performed in a different order and/or performed in parallel. Additionally, some implementations may perform only some of the actions shown. Operations of the method 1100 may be performed by an implementation of the SLM 204 in one or more color cycles.

In block 1102, the SLM 204 receives (from the control circuit 202) one or more bit plane. The bit plane may be a bookend bit plane, a bit pair bit plane, or a standalone bit plane.

In block 1104, the SLM 204 stores the received bit plane in the memory 212.

In block 1106, the SLM 204 receives (from the control circuit 202) a global reset signal.

In block 1108, responsive to the global reset signal, the SLM transfers bit plane data from the memory 212 to the pixel array 210. That is, all bit plane data stored in the memory 212 is transferred to the pixel array 210 responsive to the global reset signal. Data of the various bit planes may have been stored in the memory 212 at different times and prior to difference activations of the global reset signal. For example, the SLM receives a bookend bit plane in block 1102 that is stored in the memory 212 in block 1104. The bookend bit plane applies to the entire pixel array 210, and responsive to a global reset signal received in block 1106, the bookend bit plane is transferred to all sub-arrays of the pixel array 210 in block 1108. After transfer of the bookend bit plane, the SLM receives a bit pair bit plane in block 1102 and stores the bit pair bit plane in the memory 212 in block 1104. The bit pair bit plane applies only to a selected sub-array of the pixel array 210, and responsive to a global reset signal received in block 1106, the bit pair bit plane is transferred to the selected sub-array, and the bookend bit plane is transferred to all sub-arrays of the pixel array 210 except the selected sub-array in block 1108.

Modifications are possible in the described embodiments, and other embodiments are possible, within the scope of the claims.

What is claimed is:

1. A control circuit, comprising:
a sequencing circuit configured to:
in a color cycle:
transfer a first bit plane to a spatial light modulator (SLM);
transmit a first global reset signal to the SLM instructing the SLM to load data of the first bit plane to pixel sub-arrays of the SLM;
transfer a second bit plane to the SLM; and
transmit a second global reset signal instructing the SLM to load data of the second bit plane to a first pixel sub-array of the pixel sub-arrays and to load data of the first bit plane to a second pixel sub-array of the pixel sub-arrays;
transmit a third global reset signal instructing the SLM to load data of a third bit plane to the first pixel sub-array and to load data of the first bit plane to the second pixel sub-array; and
transmit a fourth global reset signal to load data of the third bit plane to the first pixel sub-array, load data of the second bit plane to the second pixel sub-array, and load data of the first bit plane to a third pixel sub-array of the pixel sub-arrays.

2. The control circuit of claim 1, wherein:
the first bit plane is a bookend bit plane corresponding to a most significant bit of the color cycle;
the second bit plane corresponds to a least significant bit of the color cycle;
the third bit plane corresponds to a second most significant bit of the color cycle; and
the second bit plane and the third bit plane constitute a bit pair.

3. The control circuit of claim 2, wherein the color cycle is a first color cycle, and wherein:
the bookend bit plane is a first bookend bit plane; and
the sequencing circuit is configured to:
in a second color cycle after the first color cycle:
transfer a second bookend bit plane to the SLM: and
transmit a fifth global reset signal instructing the SLM to load data of the second bookend bit plane to the pixel sub-arrays.

4. The control circuit of claim 2, the color cycle is a first color cycle, and wherein:
the sequencing circuit is configured to:
in a second color cycle and the first color cycle:
transfer a standalone bit plane to the SLM: and
transmit a fifth global reset signal instructing the SLM to load data of the standalone bit plane to the pixel sub-arrays.

5. The control circuit of claim 1, wherein:
the color cycle is a first color cycle; and
the sequencing circuit is configured to:
in a second color cycle:
activate a fifth global reset signal instructing the SLM to load data of the first bit plane to the pixel sub-arrays;
activate a sixth global reset signal to load data of the second bit plane the third pixel sub-array and to load data of the first bit plane to the first pixel sub-array and the second pixel sub-array.

6. The control circuit of claim 5, wherein the sequencing circuit is configured to:
in the second color cycle:
activate a seventh global reset signal instructing the SLM to load data of the third bit plane to the third pixel sub-array and load data of the first bit plane to the first pixel sub-array and the second pixel sub-array.

7. The control circuit of claim 6, wherein the sequencing circuit is configured to:
in the second color cycle:
activate an eighth global reset signal instructing the SLM to load data of the second bit plane to the second pixel sub-array, load data of the third bit plane to the third pixel sub-array, and load data of the first bit plane to the first pixel sub-array.

8. A spatial light modulator (SLM), comprising:
a pixel array comprising pixel sub-arrays;
a memory coupled to the pixel array, the memory configured to store pixel data;
wherein the SLM is configured to:
in a color cycle:
receive a first bit plane and store the first bit plane in the memory;

responsive to receiving a first global reset signal, transfer data of the first bit plane from the memory to the pixel sub-arrays;
receive a second bit plane and store the second bit plane in the memory;
responsive to receiving a second global reset signal:
transfer data of the second bit plane to a first of the pixel sub-arrays; and
transfer data of the first bit plane from the memory to a second of the pixel sub-arrays;
receive a third bit plane and store the third bit plane in the memory;
responsive to receiving a third global reset signal:
transfer data of the third bit plane from the memory to the first of the pixel sub-arrays; and
transfer data of the first bit plane to the second of the pixel sub-arrays; and
wherein:
the first bit plane corresponds to a most significant bit of the color cycle;
the second bit plane corresponds to a least significant bit of the color cycle; and
the third bit plane corresponds to a second most significant bit of the color cycle.

9. The SLM of claim 8, wherein:
the first bit plane is a bookend bit plane; and
the second bit plane and the third bit plane constitute a bit pair.

10. The SLM of claim 8, wherein:
the color cycle is a first color cycle: and
the SLM is configured to:
in a second color cycle:
responsive to receiving a fourth global reset signal:
transfer data of the third bit plane from the memory to the first of the pixel sub-arrays;
transfer data of the second bit plane from the memory to the second of the pixel sub-arrays; and
transfer data of the first bit plane to a third of the pixel sub-arrays; and
responsive to receiving a fifth global reset signal:
transfer data of the second bit plane from the memory to the third of the pixel sub-arrays; and
transfer data of the first bit plane to the first of the pixel sub-arrays.

11. The SLM of claim 10, wherein the SLM is configured to:
in the second color cycle:
responsive to receiving a sixth global reset signal:
transfer data of the third bit plane from the memory to the third of the pixel sub-arrays; and
transfer data of the first bit plane to the first and second of the pixel sub-arrays.

12. The SLM of claim 11, wherein the SLM is configured to:
in the second color cycle:
responsive to receiving an seventh global reset signal:
transfer data of the third bit plane from the memory to the second of the pixel sub-arrays;
transfer data of the second bit plane from the memory to the second of the pixel sub-arrays; and
transfer data of the first bit plane to the first of the pixel sub-arrays.

13. A projector comprising:
a spatial light modulator (SLM) comprising a pixel array comprising a first pixel sub-array, a second pixel sub-array, and a third pixel sub-array; and
a control circuit coupled to the SLM, the control circuit comprising:
a sequencing circuit configured to:
in a color cycle:
transmit a first global reset signal to the SLM, wherein responsive to receiving the first global reset signal, the SLM is configured to load data of a first bit plane to the first pixel sub-array, to the second pixel sub-array, and to the third pixel sub-array; and
transmit a second global reset signal to the SLM, wherein responsive to receiving the second global reset signal, the SLM is configured to:
load data of a second bit plane to the first pixel sub-array; and
load data of the first bit plane to the second pixel sub-array; and
transmit a third global reset signal to the SLM, wherein responsive to receiving the third global reset signal, the SLM is configured to:
load data of a third bit plane to the first pixel sub-array; and
load data of the first bit plane to the second pixel sub-array and to the third pixel sub-array.

14. The projector of claim 13, wherein:
the first bit plane corresponds to a most significant bit of the color cycle;
the second bit plane corresponds to a least significant bit of the color cycle; and
the third bit plane corresponds to a second most significant bit of the color cycle.

15. The projector of claim 13, wherein the sequencing circuit is configured to:
in the color cycle:
transmit a fourth global reset signal to the SLM, wherein responsive to receiving the fourth global reset signal, the SLM is configured to:
load data of the third bit plane to the first pixel sub-array;
load data of the second bit plane to the second pixel sub-array; and
load data of the first bit plane to the third pixel sub-array.

16. The projector of claim 13, wherein the sequencing circuit is configured to:
in the color cycle:
equalize a time that the first bit plane is loaded to the first pixel sub-array, the second pixel sub-array, and the third pixel sub-array;
equalize a time that the second bit plane is loaded to the first pixel sub-array, the second pixel sub-array, and the third pixel sub-array; and
equalize a time that the third bit plane is loaded to the first pixel sub-array, the second pixel sub-array, and the third pixel sub-array.

17. The projector of claim 13, wherein:
the color cycle is a first color cycle; and
the sequencing circuit is configured to:
in a second color cycle:
transmit a fourth global reset signal to the SLM, wherein responsive to receiving the fourth global reset signal, the SLM is configured to load data of the first bit plane to the first pixel sub-array, to the second pixel sub-array, and the third pixel sub-array;

transmit a fifth global reset signal to the SLM, wherein responsive to receiving the fifth global reset signal, the SLM is configured to:
load data of the second bit plane to the third pixel sub-array; and
load data of the first bit plane to the first pixel sub-array and the second pixel sub-array;
transmit a sixth global reset signal to the SLM, wherein responsive to receiving the sixth global reset signal, the SLM is configured to:
load data of the third bit plane to the third pixel sub-array; and
load data of the first bit plane to the first pixel sub-array and to the second pixel sub-array; and
transmit a seventh global reset signal to the SLM, wherein responsive to receiving the seventh global reset signal, the SLM is configured to:
load data of the second bit plane to the second pixel sub-array,
load data of the third bit plane to the third pixel sub-array, and
load data of the first bit plane to the first pixel sub-array.

18. The projector of claim 17, wherein the sequencing circuit is configured to:
over the first color cycle and the second color cycle:
equalize a time that the first bit plane is loaded to the first pixel sub-array, to the second pixel sub-array, and to the third pixel sub-array;
equalize a time that the second bit plane is loaded to the first pixel sub-array, to the second pixel sub-array, and to the third pixel sub-array; and
equalize a time that the third bit plane is loaded to the first pixel sub-array, to the second pixel sub-array, and to the third pixel sub-array.

* * * * *